United States Patent [19]

Hampshire

[11] 3,918,762
[45] Nov. 11, 1975

[54] VEHICLE WHEEL COVER
[75] Inventor: William J. Hampshire, Peninsula, Ohio
[73] Assignee: The Goodyear Tire & Rubber Company, Akron, Ohio
[22] Filed: Mar. 29, 1974
[21] Appl. No.: 455,994

[52] U.S. Cl. .......... 301/37 P; 301/63 PW; 301/37 R
[51] Int. Cl.² ........................................... B60B 7/00
[58] Field of Search .......... 301/37 P, 37 R, 37 LM, 301/37 TC, 63 PW

[56] References Cited
UNITED STATES PATENTS
2,415,829  2/1947  Lyon ................................ 301/37 P
3,669,501  6/1972  Derleth............................. 301/37 P Primary Examiner—Lloyd L. King
Assistant Examiner—D. W. Keen
Attorney, Agent, or Firm—Barnes, Kisselle, Raisch & Choate

[57] ABSTRACT

An automotive wheel cover with an outer ring of an elastomeric material having a central aperture, an inboard face contoured for engagement with a disc of a wheel and an outboard face with a decorative countour. A center cap overlies the aperture of the ring and is releasably retained therein by a resilient circumferential flange which snaps into engagement therewith. The outer ring can be releasably snapped into retaining engagement with the wheel and may be permanently secured thereto by an adhesive.

27 Claims, 8 Drawing Figures

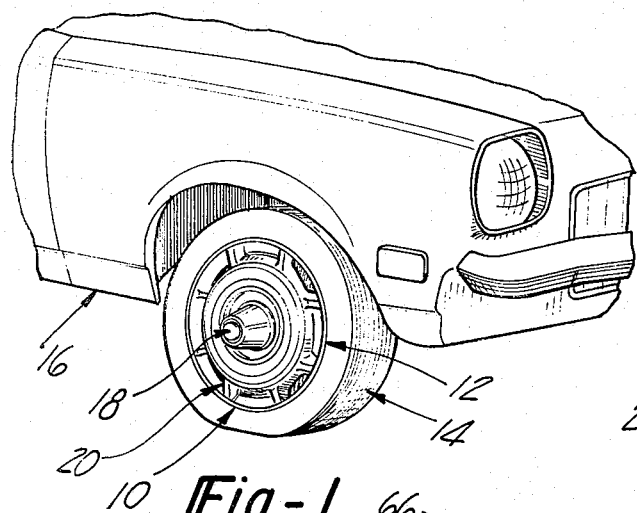
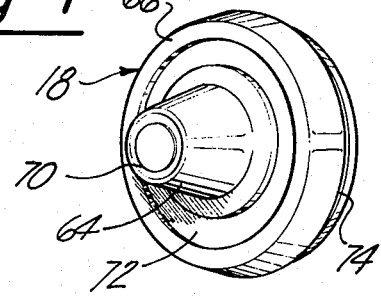
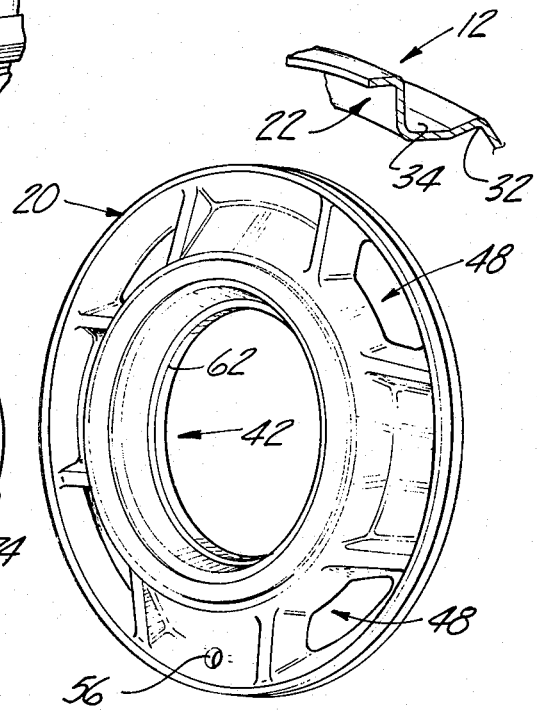
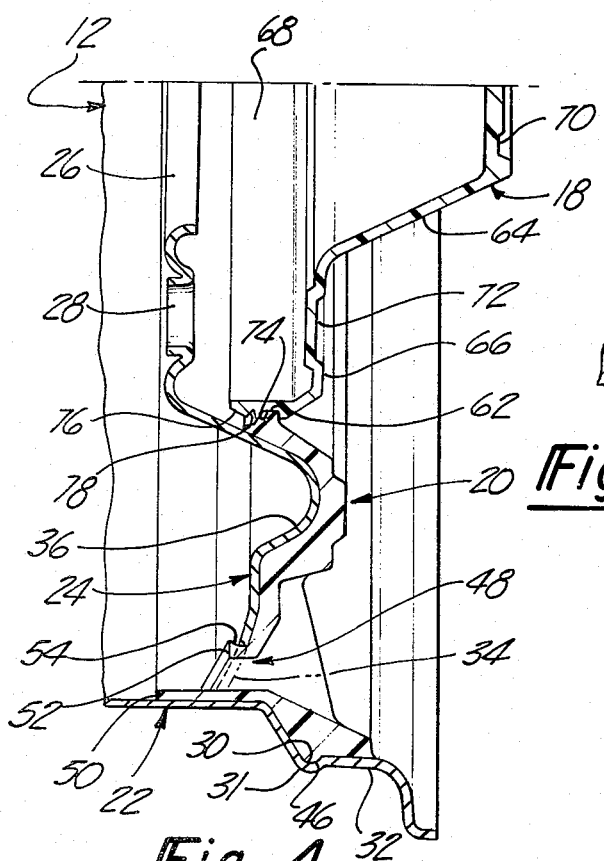
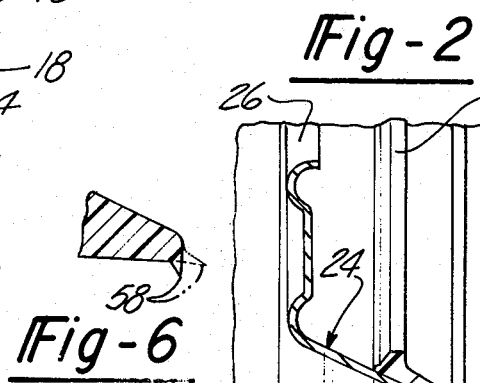

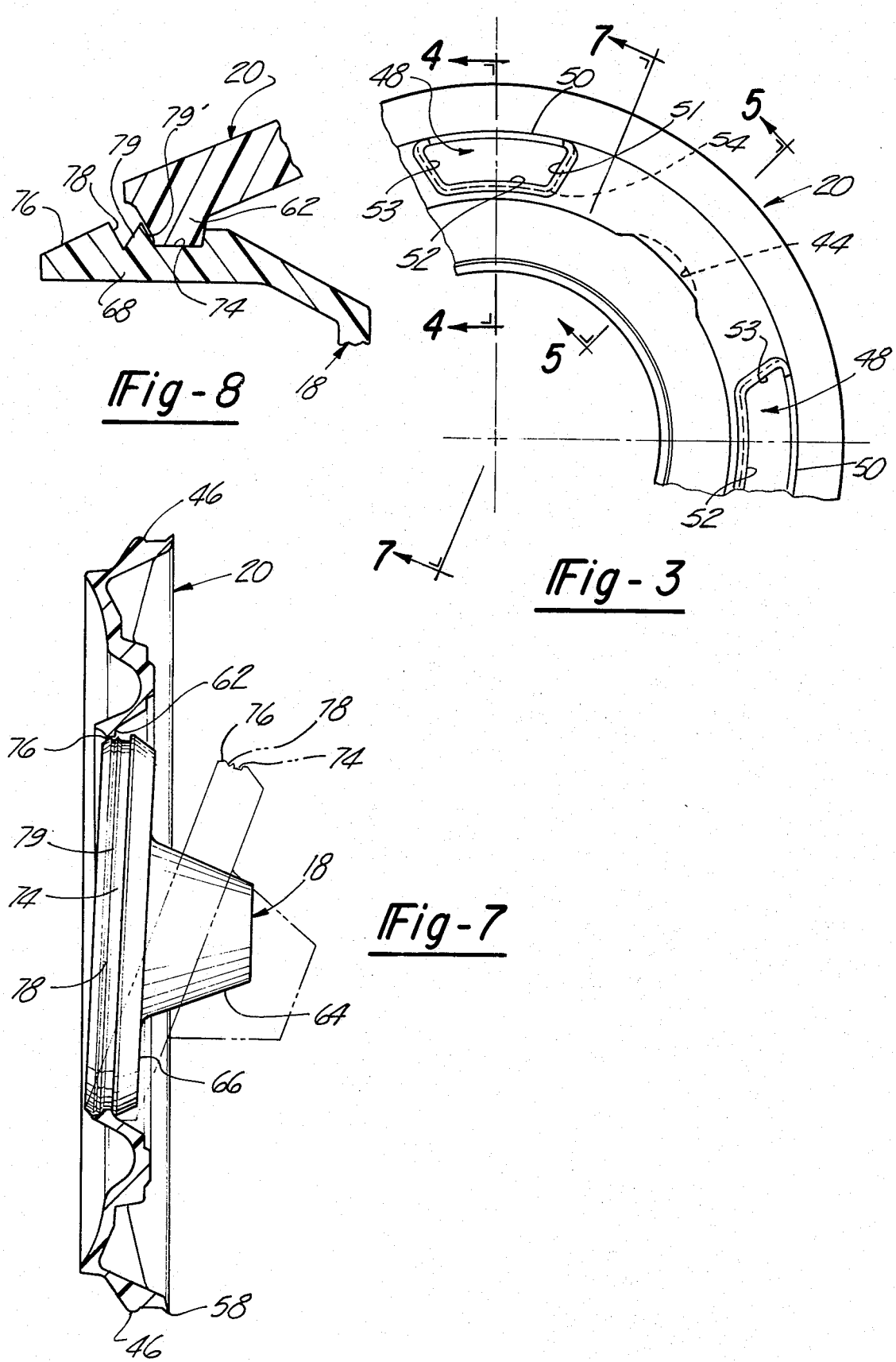

VEHICLE WHEEL COVER

This invention relates to automotive wheels and more particularly to a decorative plastic wheel cover.

Objects of this invention are to provide a styled decorative wheel cover which can be readily attached to a conventional vehicle wheel, provides easy access to the wheel mounting bolts, and can be economically manufactured, shipped and assembled on a wheel.

These and other objects, features and advantages of this invention will be apparent from the following description, appended claims and accompanying drawings in which:

FIG. 1 is a fragmentary perspective view of a vehicle with a wheel cover embodying this invention mounted on a wheel of the vehicle.

FIG. 2 is an enlarged exploded perspective view of the wheel cover of FIG. 1 illustrating an outer ring and a center cap thereof, and a fragmentary portion of the associated wheel rim.

FIG. 3 is an enlarged fragmentary view of the inboard or rear face of the outer ring.

FIGS. 4 and 5 are enlarged fragmentary sectional views on the lines 4—4 and 5—5 of FIG. 3 (but inverted therefrom) illustrating the outer ring (and in FIG. 4 the center cap) of the wheel cover in assembled relation mounted on a vehicle wheel.

FIG. 6 is an enlarged fragmentary sectional view of a portion of the outer ring circled in FIG. 5 illustrating a sealing lip thereof.

FIG. 7 is an enlarged full sectional view of the outer ring on line 7—7 of FIG. 3 illustrating insertion and removal of the center cap into and from the outer ring.

FIG. 8 is an enlarged fragmentary sectional view of a portion of the outer ring and center cap of the wheel cover illustrating the structure releasably retaining the center cap in the outer ring.

Referring in more detail to the accompanying drawings, FIG. 1 illustrates a wheel cover 10 embodying this invention mounted on a vehicle wheel 12 with a pneumatic tire 14 thereon of an automobile 16. Wheel cover 10 has a center cap 18 removably carried by an outer ring 20 (FIG. 2) which is secured to vehicle wheel 12. As shown in FIGS. 4 and 5, vehicle wheel 12 may be a conventional design made up of a drop-center steel rim 22 fixed as by welding to a spider or disk 24 having a central aperture 26 and a plurality of equally circumferentially spaced bolt mounting holes 28 extending axially therethrough in the bolt hole mounting circle area. Rim 22 has a circumferentially continuous internal groove 30 therein forming a continuous tire bead retaining ledge 31 in the bead seat area 32 of the rim. Disk 12 has four equally circumferentially spaced elongate cut-outs or air ports 34 therethrough adjacent the outer periphery thereof (FIG. 4). Disk 12 also has an annular ridge 36 with four equally circumferentially spaced integral protrusions (only one of which is shown in FIG. 5) forming four lugs 38 in the outboard face of the disk each defining a radially reentrant under cut portion 40. Lugs 38 are conventionally used to retain a hub cap on wheel 12.

Outer ring 20 comprises a one-piece annular body preferably made of a homogeneous elastomeric material with a central aperture 42 therethrough encircling the bolt mounting holes 28 of wheel 12. The inboard face of ring 20 substantially conforms with the outboard face of disk 24 and the adjacent face of rim 22 of wheel 12 for substantially complete face-to-face contact therewith when ring 20 is mounted on the vehicle wheel. Ring 20 is located and releasably retained on wheel 12 by four equally circumferentially spaced pockets 44 in the inboard face of ring 20 (FIG. 3) contoured for locking engagement with lugs 38 of disk 24. Ring 20 is also releasably retained on wheel 12 by a circumferentially continuous bead or rib 46 extending around the outer periphery thereof which tightly engages groove 30 of rim 22.

The outboard face or ring 20 has a decorative contour which varies from the functional contour of the outboard face of wheel 12, and ring 20 has four elongate vent openings 48 therethrough overlying cut-outs 34 of disk 22. Each vent opening at its inboard end is defined by the interior surfaces of four side wall portions 50, 51, 52 and 53 (FIGS. 3 and 4) extending generally axially through cut-outs 34 of the wheel. Each of the wall portions 51, 52 and 53 preferably has a reentrant exterior surface 54 which provides a mechanical interlock with the respectively adjacent edges of the disk 24 defining the associated cut-out 34 to assist in retaining ring 20 on wheel 12. Wall portions 50 each extend axially inwardly beyond portions 51, 52 and 53 well through its associated cut-out 34, to lie against the inner surface of rim 22 and thus extend the outboard face of ring 20 axially inwardly of the cut-outs 34. Ring 20 has a hole 56 (FIG. 2) to provide clearance for a valve stem to extend through the ring. Ring 20 also has a flexible lip 58 (FIGS. 5 and 7) extending around its outer periphery adjacent the outboard edge thereof, which is deflected and flexed from a radially outwardly protruding free-state condition (as shown in solid lines in FIG. 6) to an axially outwardly protruding position (as shown in broken lines in FIG. 6 and in solid lines in FIGS. 4 and 5) during assembly of ring 20 to wheel 12 to thereby form a seal between ring 20 and rim 22.

As best seen in FIGS. 4, 7 and 8, center cap 18 is carried by ring 20 on a circumferential internal rib 62 thereof which extends generally radially into aperture 42. Cap 18 is generally hat-shaped with a frustoconical crown 64 and an encircling radially extending brim 66 terminating in a generally axially extending circumferential flange or band 68 (FIG. 8). Cap 18 has a decorative outboard face with two ornamental circular recesses or grooves 70 and 72 therein (FIG. 2) and is preferably a one-piece homogeneous body of a resilient elastomeric material. Band 68 has an external groove 74 in the outboard face thereof for receiving rib 62 of outer ring 20 therein with a close fit. An inclined conical surface 76 on the outboard face of band 68, and a circumferential groove 78 between surface 76 and groove 74, facilitate camming and flexing of the outer edge of band 68 radially inwardly for snapping groove 74 into engagement with rib 62 of ring 20 during installation of cap 18 on ring 20.

Wheel cover 10 is initially mounted on wheel 12 by forcing ring 20 endwise into engagement co-axially with the outboard face of the wheel which, due to the inherent resiliency of the outer ring, causes the ring to distort and flex until pockets 44, wall portions 51, 52 and 53 and circumferential rib 46 register with and snap into locking engagement respectively with lugs 38, the edges of cut-outs 34, and groove 30 of the wheel to thereby positively locate and mechanically retain ring 20 on wheel 12. Preferably, ring 20 is permanently secured to wheel 12 in this positively located position by an adhesive interposed between the wheel and the outer ring. During assembly of ring 20 to wheel 12, lip 58 is flexed by its sliding engagement with the inner periphery of the bead seat area 32 of rim 22 from the solid to the broken line positions shown in FIG. 6 to provide a yieldably biased seal preventing escape of the adhesive.

Cap 18 is then inserted into aperture 42 of ring 20 and releasably retained therein by snapping groove 70 into engagement with rib 62 of the ring. Cap 18 can be readily manually inserted without using any tools by manually grasping crown 64 of cap 18 and positioning the cap in coaxial alignment with ring 20 to bring surface 76 into engagement with the outboard edge of rib 62. A force in the range of about 5 to 15 pounds manually applied via crown 64 to push the cap further into ring 20 is sufficient to cause rib 62 as it slides across surface 76 to radially compress cap flange 68. This deflection allows rib 62 to slide beyond surface 76 then to bridge groove 78 as it slides over rib 79 and then into registry with groove 74, whereupon rib 62 snaps into groove 74. It is to be noted that the shallow inclination of surface 76 (approximately 30° to the axis of cap 20) significantly reduces the force required to push cap 18 straight home into seated position on ring 20. The insertion force is further reduced by groove 78 which, by reducing the sectional thickness of band 68, imparts greater flexibility to the inboard edge of band 68.

On the other hand, removal of cap 18 from ring 20 requires a greater amount of force due to the steeper angle of the conical surface 79' which forms the inboard side of rib 79. As best seen in FIG. 8, surface 79' is inclined at about 60° to the axis of cap 18 and in the opposite direction from camming surface 76. Therefore, cap 18 cannot be readily removed by reversing the aforementioned installation procedure; i.e., it requires approximately a force preferably in the range 15 to 45 pounds exerted from left to right as viewed in FIGS. 4 or 7 to dislodge cap 18 from seated engagement with ring 20. Moreover, due to the outwardly narrowing taper of crown 64, it is difficult to get a good grip on the crown in order to exert enough pulling force axially thereof to manually remove the cap. However, the cap can be readily manually removed without using tools by pivoting the cap, as shown in FIG. 7, about an edge thereof on a portion of groove 74 engaged with rib 62. This can be easily done because crown 64 of cap 18 protrudes outwardly far enough to provide a convenient handle or grip for manually grasping the cap. Since crown 64 extends substantially outboard of groove 74 pushing on the crown in a direction transverse to the cap axis produces a substantial moment arm which facilitates prying the cap loose by such pivotal motion in order to remove the cap from ring 20. If desired, the pivoting procedure can also be used to advantage in inserting the cap on the ring. A crown 64 with a mean diameter in the range of about one to three and a half inches and preferably one and a half to three inches is believed to provide a satisfactory hand grip, and extending the crown at least about one and a half and preferably two inches axially outward from the plane of groove 74 when the cap and ring are constructed to the scale of the drawings, has been found to greatly facilitate manual insertion and removal of cap 18 without requiring any tools.

It will be apparent that the snap retention of center cap 18 in ring 20 could be achieved by making circumferential flange 68 of the center cap substantially rigid and rib 62 of ring 20 resiliently flexible or by making both rib 62 and flange 68 resiliently flexible. Also, groove 74 and rib 62 may be reversed so that center cap 18 would have a circumferentially extending rib projecting radially outwardly of flange 68 thereof and ring 20 would have a mating circumferential groove in aperture 42. Likewise, camming surface 76 and associated undercut groove 78 could be provided on ring 20.

Suitable inherently resilient plastic and/or elastomeric materials for making ring 20 are: natural and synthetic elastomers of the polymers of the conjugated diolefins of 4 to 10 carbon atoms and copolymers of said diolefins with monoolefins of 2 to 12 carbon atoms such as acrylonitrile and styrene. Particularly preferred are polybutadiene, styrene and acrylonitrile. Where the natural and synthetic elastomers are used or the plastic has relatively high unsaturation, then the elastomer should be compounded with relatively large amounts of antioxidants 0.3 to 1 PHR) and antiozonants (1.5–5.0 PHR) such as those listed in Du Pont's "Chemicals for Elastomers" catalogue (SD 7–67 A-54456). Solid or microcellular polyurethanes, nylon, polypropylene, polyethylene, high density, ethylene propylene rubber, polypropylene oxide rubber and copolymers of polypropylene oxide rubbers, ABS resin and acrylic and methacrylic resins may also be utilized. Preferably, the detachable cap 18 is made in a separate molding operation of similar elastomeric materials although it may be made of other materials such as metal.

When the elastomeric material is completely cured, it is believed ring 20 should have a density in the range of about 20 to 72 pounds per cubic foot and preferably in the range of 20 to 40 pounds per cubic foot. In the example shown, a density of 40 to 45 pounds per cubic foot has produced satisfactory rings 20 for wheel covers 10. Preferably, the elastomeric material of ring 20 when fully cured generally will have an elongation of 20 to 800 percent at break, with the preferred range being 100 to 300 percent. The outboard face of ring 20 preferably has a Shore A hardness of at least 60 and preferably in the range of 85 to 100 to provide a smooth, relatively hard decorative surface less susceptible to damage in use and better able to receive a coat of paint with a high gloss.

Suitable adhesives for permanently adhering outer ring 20 to wheel 12 are: liquid polyurethanes such as that sold under the trademark Pliogrip 600 OA/6011 by The Goodyear Tire & Rubber Company, two component adhesive produced according to the teachings of U.S. patent application Ser. No. 9131, filed Feb. 11, 1970, now U.S. Pat. No. 3,812,003, issued May 21, 1974, nitrile adhesives such as a low boiling point solution or dispersion of polybutadiene-acrylonitrile, phenolics of formaldehyde such as that sold under the trademark Pliobond 12-4 by The Goodyear Tire & Rubber Company or polyamide-epoxies such as a blend of 65 percent of Epon 828 epoxy material (Epon is a trademark of Shell Chemical Company) and 35 percent of Versamid 140 epoxy material (Versamid is a trademark of Armour Chemical Company) or those produced according to the teachings of U.S. Pat. No. 3,042,545.

Preferably, ring 20 is made separately from wheel 12 and after curing is secured thereto, although it may be molded directly on wheel 12 (with or without an intermediate primer and/or adhesive coating interposed therebetween) with the elastomeric material becoming bonded directly to the wheel during curing thereof. However, if ring 20 is made separate from wheel 12, in some situations a wheel cover 10 can be shipped to a wheel or vehicle manufacturer for mounting on a wheel 12 at less overall cost than shipping the wheel to the cover manufacturer for mounting a cover on the wheel and then shipping the complete wheel and cover assembly to the wheel or vehicle manufacturer. A wheel cover 10, with or without a center cap 18, can also be made as a finished item separate from a wheel and sold to the after market for removable mounting on conventional wheels with hubcap lugs.

Ring 20, if made of suitable elastomeric material having good elasticity and elastic memory characteristics, may be positively located and releasably retained on a wheel 12 solely by the interlocking mechanical cooperation of rib 46 with rim groove 30, cover pockets 44 with disk lugs 38, and wall portions 51–53 with disk openings 34. Suitable materials for making rings 20 to be retained on wheels 12 solely by such interlocking mechanical cooperation are believed to be the aforementioned elastomeric materials having when fully cured an elongation at break in the range of about 100 to 300 percent. Adhering ring 20 to wheel 12 with an adhesive assures permanent retention of the ring on the wheel and is particularly desirable when ring 20 is made of elastomeric materials having poor elastic memory characteristics and/or little elasticity such as low density plastic foam materials. If the separate outer ring 20 is to be permanently secured to the wheel by an adhesive, this positive location and retention structure eliminates the need for fixtures to position and retain the outer ring in firm engagement with the wheel while the adhesive sets up or dries, thereby decreasing assembly costs and permitting in the after market permanent attachment by an adhesive without requiring the use of any special tools or fixtures.

What is claimed is:

1. A cover for a vehicle wheel with a metal rim adapted to receive a tire thereon fixed to a metal disk having a bolt circle with a plurality of bolt mounting holes extending generally axially through the disk and a plurality of lugs on said disk, said cover comprising a homogeneous body of a resilient elastomer material having an inboard face contoured for contact with the outboard face of the disk, said body having a plurality of homogeneously integral pockets adapted to yieldably snap into engagement with the lugs of the disk to mechanically retain said body of said cover on the vehicle wheel, said body having an outboard face exposed to view from the outboard side of the wheel and spaced axially of the wheel outboard from said inboard face of said body, said outboard face of said body having a contour differing from the contour of the covered part of the outboard face of the disk and adapted to provide a decorative contour over at least part of the wheel, said body having a central aperture therethrough encircling the bolt mounting holes of the disk when said cover is received on the wheel, said cover also comprising a center cap overlying said central aperture and removably carried by said body.

2. The cover of claim 1 wherein said center cap comprises a member projecting generally axially outwardly of the point of engagement of said center cap with said body of said cover when said cap is carried thereby, said member being shaped for grasping by a human hand for manually removing and attaching said cap from and to said body of said cover without using any tools.

3. The cover of claim 2 wherein said member has a mean diameter in the range of about one to three and a half inches.

4. The cover of claim 2 wherein said member has a mean diameter in the range of about one and a half to three inches.

5. The cover of claim 2 wherein said center cap comprises a homogeneously resilient elastomeric material and has a generally axially and circumferentially extending flexible portion adapted to be yieldably received in said aperture in engagement with said body of said cover to releasably retain said center cap on said body of said cover.

6. The cover of claim 5 wherein said member extends outwardly from the point of engagement of said flexible portion with said body of said cover at least about one and a half inches.

7. The cover of claim 1 wherein said center cap comprises a homogeneously resilient elastomeric material and has a generally axially and circumferentially extending flexible portion adapted to be yieldably received in said aperture in engagement with said body of said cover to releasably retain said center cap on said body of said cover.

8. The cover of claim 1 adapted for use with a vehicle wheel having a circumferentially extending groove opening radially inwardly in the rim thereof, said body having a circumferentially extending peripheral rib thereon projecting into the groove on the rim of the wheel to retain said body on the wheel when said body is received on the wheel.

9. The cover of claim 1 wherein said body has a resilient lip extending continuously around the outer periphery of said body adjacent the outboard edge thereof to yieldably engage the rim of the wheel when said body is mounted thereon to provide a seal therebetween.

10. The cover of claim 1 for a vehicle wheel having a plurality of circumferentially spaced vent openings through the disk of the wheel adjacent the rim thereof, said body having a plurality of circumferentially spaced vent openings therethrough each terminating in a reentrant rib extendable through a vent opening in the disk to snap over an edge thereof to mechanically retain said body of said cover on the wheel when mounted thereon.

11. A cover for a vehicle wheel with a metal rim adapted to receive a tire thereon fixed to a metal disk having a bolt circle with a plurality of bolt mounting holes extending generally axially through the disk, said cover comprising a ring-like body of a resilient elastomeric material having an inboard face contoured for contact with the outboard face of the disk radially outwardly of the bolt mounting circle of the disk, said body having a central aperture therethrough encircling the bolt mounting holes, and a center cap overlying the central aperture and releasably carried by said body, said body having an outboard face exposed to view from the outboard side of the wheel and spaced axially of the wheel outboard of the inboard face of said body, said outboard face of said body having a contour differing from the contour of the outboard face of the disk and adapted to provide a decorative contour over at least part of the wheel, said center cap having a central portion projecting generally axially outwardly and shaped for grasping by a human hand for manually removing and attaching said center cap from and to said body without using any tools.

12. The cover of claim 11 wherein said central portion of said center cap has a mean diameter in the range of about one to three and a half inches.

13. The cover of claim 11 wherein said center cap also comprises a generally axially and circumferentially extending resilient portion adapted to be yieldably received in said aperture in engagement with said body to releasably retain said center cap on said body.

14. The cover of claim 13 wherein said central portion projects generally axially outwardly at least one and a half inches from the point of engagement of said flexible portion with said body.

15. The cover of claim 11 wherein said center cap comprises a one-piece homogeneously integral center cap of a resilient elastomeric material having an integral flange extending axially and circumferentially and adapted to be releasably received in said aperture through said body, a circumferentially extending groove element and a mating rib element with one of said elements on said body in said aperture and the other of said elements on said flange of said center cap, said flange yieldably urging said elements into engagement to releasably retain said center cap on said body when said flange is inserted into said aperture of said body.

16. The cover of claim 15 wherein each of said elements is circumferentially continuous.

17. The cover of claim 15 wherein said groove element has a conical camming surface on the periphery thereof, a second groove between said camming surface and said first mentioned groove, said first mentioned groove has a side wall closest to said camming surface inclined oppositely thereto and at a steeper angle relative to the axis of said body and cap when in said engagement.

18. A vehicle wheel including in combination a structural rim adapted to receive a tire thereon and fixed to a structural disk having a bolt circle with a plurality of bolt mounting holes extending generally axially through said disk, a decorative cover for said wheel comprising a ring-like body of a resilient elastomeric material having an inboard face contoured for contact with the outboard face of said disk radially outwardly of the bolt mounting circle of said disk, adhesive means interposed between said faces and permanently adhesively securing said cover on said disk, said cover body having a central aperture therethrough encircling the bolt mounting holes, and a decorative center cap overlying the central aperture and releasably carried by said body, said body having an outboard face exposed to view from the outboard side of the wheel and spaced axially of the wheel outboard of the inboard face of said body, said outboard face of said body having a contour differing from the contour of the outboard face of the disk and adapted to provide a decorative contour over at least part of the wheel, said center cap having a central portion projecting generally axially outwardly and shaped for grasping by a human hand for manually removing and attaching said center cap from and to said body without using any tools.

19. The wheel of claim 18 wherein said center cap also comprises a generally axially and circumferentially extending resilient portion adapted to be yieldably received in said aperture in engagement with said body to releasably retain said center cap on said body.

20. The wheel of claim 18 wherein said center cap comprises a one-piece homogeneously integral center cap of a resilient elastomeric material having an integral flange extending axially and circumferentially and adapted to be releasably received in said aperture through said body, a circumferentially extending groove element and a mating rib element with one of said elements on said body in said aperture and the other of said elements on said flange of said center cap, said flange yieldably urging said elements into engagement to releasably retain said center cap on said body when said flange is inserted into said aperture of said body.

21. The wheel of claim 20 wherein each of said elements is circumferentially continuous.

22. The wheel of claim 20 wherein said groove element has a conical camming surface on the periphery thereof, a second groove between said camming surface and said first mentioned groove, said first mentioned groove has a side wall closest to said camming surface inclined oppositely thereto and at a steeper angle relative to the axis of said body and cap when in said engagement.

23. The wheel of claim 18 wherein said disk has a plurality of axially outwardly protruding lugs disposed in a circumferential array thereon, said cover body having a plurality of homogeneously integral pockets in yieldable snap engagement with the lugs of the disk to provide mechanical interengagement between said disk and cover body to thereby assist said adhesive means in retaining said cover on said wheel disk.

24. The wheel of claim 23 wherein said center cap comprises a homogeneously resilient elastomeric material and has a generally axially and circumferentially extending flexible portion adapted to be yieldably received in said aperture in engagement with said body of said cover to releasably retain said center cap on said body of said cover.

25. The wheel of claim 24 wherein said rim has a circumferentially extending groove opening radially inwardly thereof, said body having a circumferentially extending peripheral rib thereon projecting into the groove of said rim to provide mechanical retaining interengagement between said rim and cover body to thereby assist said adhesive means in retaining said body on said wheel rim.

26. The wheel of claim 25 wherein said body has a resilient lip extending continuously around the outer periphery of said body adjacent the outboard edge thereof yieldably engaging said rim to provide a seal therebetween.

27. The wheel of claim 26 wherein said disk has a plurality of circumferentially spaced vent openings therethrough adjacent said rim, said body having a plurality of circumferentially spaced vent openings therethrough each terminating a reentrant rib extending through an associated vent opening in said disk in snap-over engagement with an edge thereof to provide further mechanical retention of said cover body on said disk.

* * * * *

UNITED STATES PATENT OFFICE
CERTIFICATE OF CORRECTION

PATENT NO. : 3,918,762
DATED : November 11, 1975
INVENTOR(S) : William J. Hampshire It is certified that error appears in the above-identified patent and that said Letters Patent are hereby corrected as shown below:

Column 4, line 47 - after "company" insert --which is a--

Signed and Sealed this thirteenth Day of April 1976

[SEAL]

Attest:

RUTH C. MASON
Attesting Officer

C. MARSHALL DANN
Commissioner of Patents and Trademarks